US008959596B2

(12) United States Patent
Nice et al.

(10) Patent No.: US 8,959,596 B2
(45) Date of Patent: Feb. 17, 2015

(54) ONE-TIME PASSWORD VALIDATION IN A MULTI-ENTITY ENVIRONMENT

(75) Inventors: Nir Nice, Kfar Veradim (IL); Ron Mondri, Bellevue, WA (US); Tomer Shiran, Haifa (IL); Boaz Ein-Gil, Zrofa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1668 days.

(21) Appl. No.: 11/454,373

(22) Filed: Jun. 15, 2006

(65) Prior Publication Data

US 2007/0294749 A1  Dec. 20, 2007

(51) Int. Cl.
*G06F 7/04* (2006.01)
*H04L 29/06* (2006.01)
*H04L 9/32* (2006.01)
*H04L 9/08* (2006.01)

(52) U.S. Cl.
CPC .......... *H04L 63/0838* (2013.01); *H04L 9/3228* (2013.01); *H04L 9/0863* (2013.01); *H04L 63/0853* (2013.01); *H04L 63/083* (2013.01)
USPC ........................................ 726/5; 726/6; 726/7

(58) Field of Classification Search
CPC ............... H04I 63/0838; H04L 9/3228; H04L 63/0853; H04L 63/083
USPC ..................... 726/2–10, 17–20; 713/182–185; 235/280, 282.5; 709/219, 217, 709/223–225, 229; 705/72, 71, 65, 66, 67; 340/5.74, 5.8, 5.81, 5.85
See application file for complete search history.

(56) References Cited

U.S. PATENT DOCUMENTS 5,802,518 A * 9/1998 Karaev et al. ...................... 707/9
5,812,819 A * 9/1998 Rodwin et al. .................. 703/23

(Continued)

FOREIGN PATENT DOCUMENTS

WO  WO 2005/083610 A1  9/2005
WO  WO 2006/006704 A2  1/2006

OTHER PUBLICATIONS

Forman, J., "Test Run: RSA Enterprise Single Sign-On Manager 4.5", Jan. 1, 2006, http://www.secureenterprisemag.com/products/showArticle.jhtml?articleID=174917934, 5 pages.

(Continued)

*Primary Examiner* — Nirav B Patel
(74) *Attorney, Agent, or Firm* — Henry Gabryjelski; Kate Drakos; Micky Minhas

(57) ABSTRACT

A single passcode can be used for validation by a user of several entities in a system without compromising security. The source of the entity providing validation credentials, along with the passcode, is considered when determining validity. A one-time password system validates credentials if a validation credentials, such as a user's valid passcode and the source of the credentials, have not been used previously. In a one-time passcode system, a validation processor receives validation credentials from a client processor. If the client processor has not previously sent the validation credentials to the validation processor, and the credentials are valid, the validation processor will validate the credentials. Otherwise, the credentials are invalid. Other client processors can utilize the same passcode and their respective source identifiers, and as long as the other client processors have not previously utilized the credentials, the credentials are declared valid.

16 Claims, 5 Drawing Sheets

(56) References Cited

U.S. PATENT DOCUMENTS

| | | | |
|---|---|---|---|
| 6,006,334 A * | 12/1999 | Nguyen et al. | 726/5 |
| 6,026,445 A * | 2/2000 | Kephart et al. | 709/245 |
| 6,085,324 A * | 7/2000 | Ogram | 726/5 |
| 6,343,361 B1 * | 1/2002 | Nendell et al. | 713/171 |
| 6,418,472 B1 * | 7/2002 | Mi et al. | 709/229 |
| 6,665,383 B1 * | 12/2003 | Kim | 379/102.02 |
| 6,826,696 B1 | 11/2004 | Chawla et al. | 713/201 |
| 6,895,511 B1 * | 5/2005 | Borsato et al. | 726/5 |
| 6,938,167 B2 * | 8/2005 | Roskind | 726/22 |
| 6,959,392 B1 * | 10/2005 | Yamamoto et al. | 726/5 |
| 7,039,812 B2 * | 5/2006 | Kawan et al. | 713/186 |
| 7,069,584 B1 * | 6/2006 | Davis | 726/5 |
| 2001/0045451 A1 | 11/2001 | Tan et al. | 235/375 |
| 2003/0009695 A1 * | 1/2003 | Sato | 713/201 |
| 2003/0079147 A1 | 4/2003 | Hsieh et al. | 713/201 |
| 2003/0130949 A1 * | 7/2003 | Ahles et al. | 705/45 |
| 2003/0182551 A1 | 9/2003 | Frantz et al. | 713/170 |
| 2003/0204725 A1 * | 10/2003 | Itoi et al. | 713/168 |
| 2004/0230831 A1 | 11/2004 | Spelman et al. | 713/201 |
| 2004/0236702 A1 * | 11/2004 | Fink et al. | 705/73 |
| 2005/0015490 A1 | 1/2005 | Saare et al. | 709/225 |
| 2005/0027989 A1 * | 2/2005 | Sandhu et al. | 713/182 |
| 2005/0177730 A1 | 8/2005 | Davenport et al. | 713/182 |
| 2005/0204147 A1 * | 9/2005 | Yamasaki et al. | 713/183 |
| 2005/0240763 A9 | 10/2005 | Bhat et al. | 713/169 |
| 2005/0243719 A1 * | 11/2005 | Haverinen et al. | 370/230 |
| 2006/0020816 A1 * | 1/2006 | Campbell | 713/182 |
| 2006/0031292 A1 * | 2/2006 | Deshpande | 709/204 |
| 2006/0031683 A1 | 2/2006 | Marion et al. | 713/185 |
| 2006/0041756 A1 * | 2/2006 | Ashok et al. | 713/183 |
| 2006/0114863 A1 * | 6/2006 | Sanzgiri et al. | 370/338 |
| 2006/0179472 A1 * | 8/2006 | Chang et al. | 726/2 |
| 2007/0079136 A1 * | 4/2007 | Vishik et al. | 713/186 |
| 2007/0136792 A1 * | 6/2007 | Ting et al. | 726/5 |
| 2007/0260544 A1 * | 11/2007 | Wankmueller | 705/44 |
| 2008/0040285 A1 * | 2/2008 | Wankmueller | 705/67 |

OTHER PUBLICATIONS

Volchkov, A., "Revisiting Single Sign-On: A Pragmatic Approach in New Context", *IT Professional*, Jan./Feb. 2001, 3(1), 39-45, http://ieeexplore.ieee.org.

"Open Specifications Integrate One-Time Passwords with Enterprise Applications", RSA Security, Inc., 2005, 10 pages, http://www.rsasecurity.com/rsalabs/otps/datasheets/OTP_WP_0205.pdf.

"VeriSign® Unified Authentication", 2005, 4 pages, http://www.verisign.com/static/DEV016111.pdf.

* cited by examiner

ONE-TIME PASSWORD VALIDATION IN A MULTI-ENTITY ENVIRONMENT

TECHNICAL FIELD

The technical field relates generally to computing system security and more specifically relates to computing system security validation.

BACKGROUND

Typical one-time password validation systems do not allow validation of more than one authentication request using the same passcode. For example, if a first entity requests authentication based on a passcode, a second entity requesting authentication based on the same passcode will not receive validation, even if the first request was validated. This is problematic in computing systems utilizing untrusted delegation. In a system utilizing untrusted delegation, once a user's credentials (e.g., user name and password) are validated, the credentials are propagated to other components in the system for validation. One-time password validation also is problematic in systems utilizing direct authentication. In a system utilizing direct authentication, each component of a system is directly authenticated, by a validation server or the like, via an authentication protocol, such as a challenge-response protocol. Validated credentials for one component of the system however, do not carry over to other components in the system.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A one-time password system validates authentication credentials (also referred to as validation credentials) if a user's credentials, such as a valid passcode, and the source of the valid passcode, have not been used previously. A validation processor receiving authentication credentials from a client processor, will consider the identity of the client processor along with other received validation credentials. If the client processor has not previously sent the validation credentials to the validation processor, and the credentials are valid, the validation processor will validate the credentials. If however, the client processor has sent the credentials previously, the validation processor will not validate the credentials. Other client processors in the system can provide the same credentials to the validation processor, and as long as the other client processors have not previously sent the credentials to the validation processor, the validation processor will validate the credentials. Thus, a user is not required to provide a different passcode for each client processor in the system. In various configurations, any one of several passwords can be used, the system can validate credentials within a predetermined time period, and/or credentials can remain valid for predetermined amount of time, after which the credentials become invalid.

BRIEF DESCRIPTION OF THE DRAWINGS

The foregoing summary, as well as the following detailed description, is better understood when read in conjunction with the appended drawings. For the purpose of illustrating one-time password validation in a multi-entity environment, there is shown in the drawings exemplary constructions thereof; however, one-time password validation in a multi-entity environment is not limited to the specific methods and instrumentalities disclosed.

DETAILED DESCRIPTION OF ILLUSTRATIVE EMBODIMENTS

Figure 1:
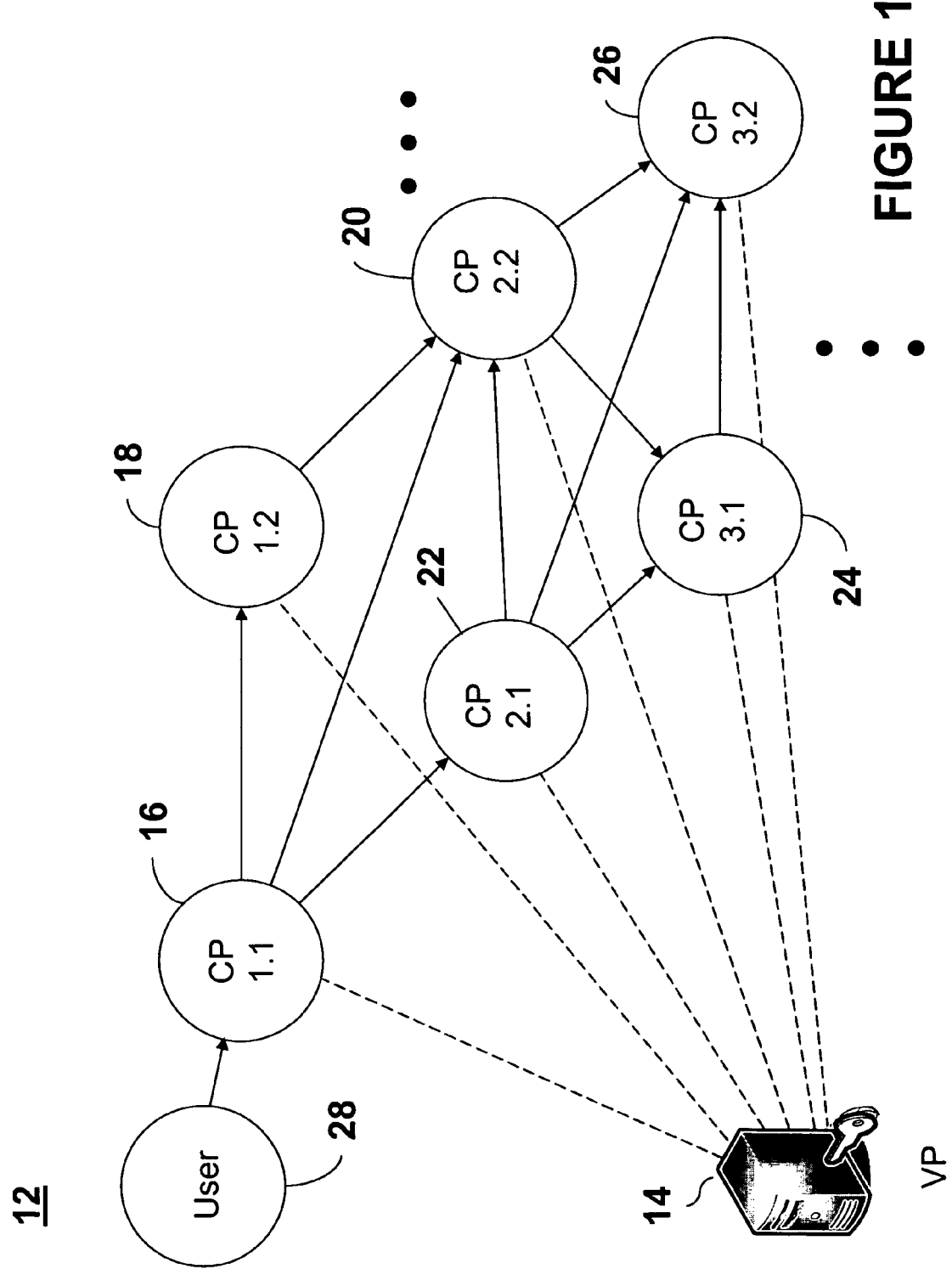
FIG. 1 is an illustration of an example one-time password system.

FIG. 1 is an illustration of an example one-time password system 12. The system 12 comprises a validation processor (VP) 14 and several client processors (CP) 16, 18, 20, 22, 24, 26. The client processors are in communication within the system 12 as indicated by the solid arrows. The validation processor 14 is in communication with the client processors as indicated by the dashed lines. It is to be understood that the system 12 is exemplary. A one-time password system can comprise any appropriate number of validation processors and client processors. The components of a one-time password system can communicate in any appropriate configuration.

In operation, as illustrated in exemplary FIG. 1, a user, depicted by user processor 28, provides a validation credential to the client processor 16. The client processor 16 can be a gateway processor to the system 12, or any client processor of the system 12. The validation credential can comprise any appropriate credential, or credentials, such a password, a username, a passcode, or the like. For example, the user credential can comprise a passcode that was generated from the user's password and username. In another example, the user credential can comprise a one-time element, such as a physical token, and a secret know by the user, such as a personal identification number (PIN). The client processor 16 provides the validation credential and a second credential to the validation processor 14. The second credential comprises an indication of the source of the two credentials being provided. That is, the second credential comprises an indication of the client processor 16. In an example embodiment, the second credential is indicative of the serial number, a network assigned value, an IP address, or the like, of the client processor 16. The validation processor 14 identifies the client processor via the second credential. For example, the client processor 16 could expressly identify itself to the validation processor 14 via a certificate or pre-configured password. The client processor 16 also could be implicitly identified via its IP address. As depicted in FIG. 1, the client processor 16 has client processor value CP 1.1.

The validation processor 14, upon receiving the validation credential and the identifier (CP 1.1), referred to herein as the user credentials, of the client processor 16, determines if the user credentials previously has been provided. That is, the validation processor 14, determines if it has previously received a request for validation based on the passcode and client processor identifier CP 1.1. If the validation processor 14 has not received the user credentials in the past, and the passcode and identifier of the client processor are valid, the validation processor 14 validates the user credentials. The validation-processor 14 will provide notification to the client processor 16 that the credentials are valid, and the user processor will be validated. At that point the user may be granted access to the system 12, allowed to conduct secure transactions with the client processor 16, or the like, for example.

If the user wants to conduct secure transactions with another client processor in the system 12, the user need not generate another passcode. Or more specifically, if a client processor needs to contact another client processor to conduct a secure transaction for the user, the user need not generate another passcode. The user (e.g., user processor 28) can provide the previously generated passcode to another client processor in the system 12. For example, if the user wants to conduct secure transactions with client processor 20, the client processor 16 passes the previously generated passcode to the client processor 20. The client processor 20 provides the passcode, as a first validation credential, and an identifier (CP 2.2) of the client processor 20, as a second validation credential, to the validation processor 14. The validation processor 14, determines if the user credentials, the passcode and the identifier CP 2.2, previously have been provided for validation. If not, and each of the validation credentials is valid, the validation processor 14 determines that the credentials are valid and provides notification thereof to the client processor 20. The user can then conduct secure transactions, or the like, with the client processor 20.

Figure 2:
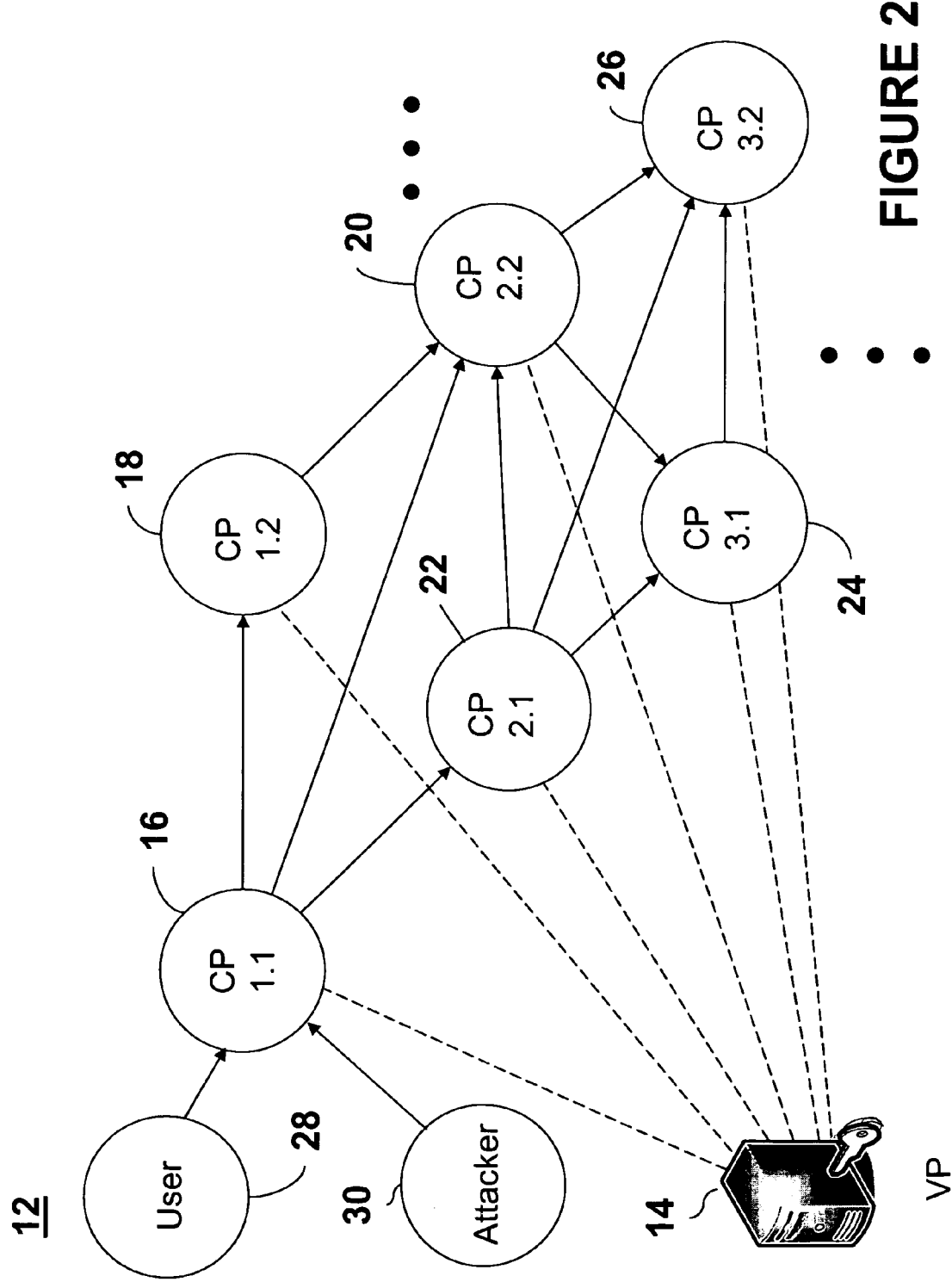
FIG. 2 is an illustration of an unauthorized attacker attempting to gain access to the system of FIG. 1.

Referring to FIG. 2, there is shown an unauthorized attacker 30 attempting to gain access to the system 12. Assuming the attacker 30 has gained access to the previously generated passcode, the attacker 30 provides the previously generated passcode to the client processor 16 in an attempt to gain unauthorized access to the system 12. The client processor 16 provides the passcode received from the attacker 30 and the client processor identifier, CP 1.1, to the validation processor 14 for validation. The validation processor 14 determines that the user credentials has been used before as a basis for validation, and declares the credentials invalid. Thus, the attacker 30 is denied access to the system 12.

Figure 3:
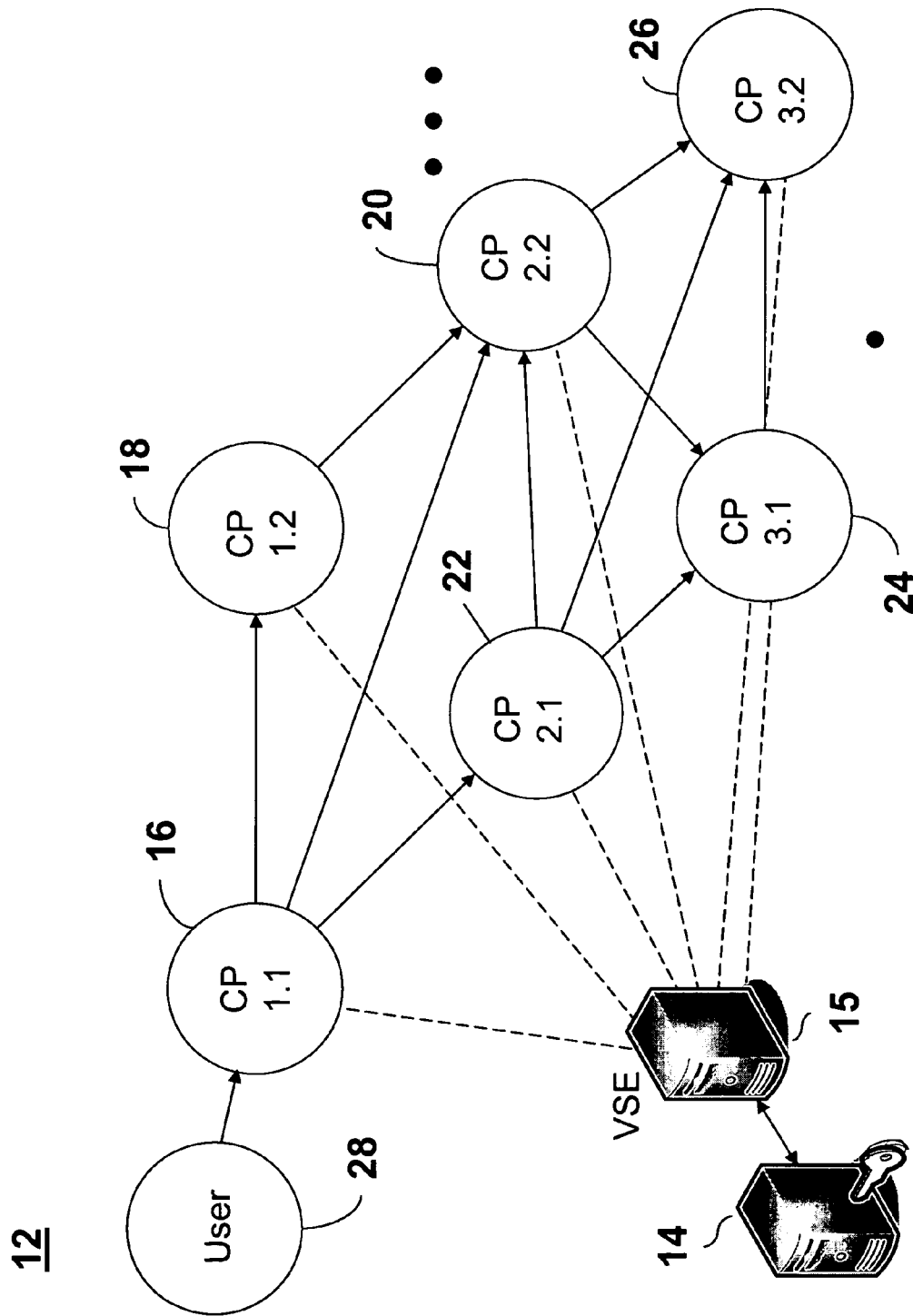
FIG. 3 is an illustration of another example one-time password system.

FIG. 3 is an illustration of an example one-time password system 12 comprising validation server enhancer (VSE) 15. The validation server enhancer 15 is implemented as an intermediate processor between the validation processor 14 and the client processors. The implementation depicted in FIG. 3 allows the functionality of an existing validation processor to be extended without modifying the existing validation processor. The validation server enhancer 15 performs the functions of the validation processor 14 as described above. The validation server enhancer 15 receives validation requests provided by client processors to the validation processor 14. The validation server enhancer 15 keeps track of client processor validation. The validation server enhancer 15 is capable of receiving and providing responses from the validation processor 14 to the client processors. The validation server enhancer 15 can intercept requests from a client processor and return appropriate responses.

Figure 4:
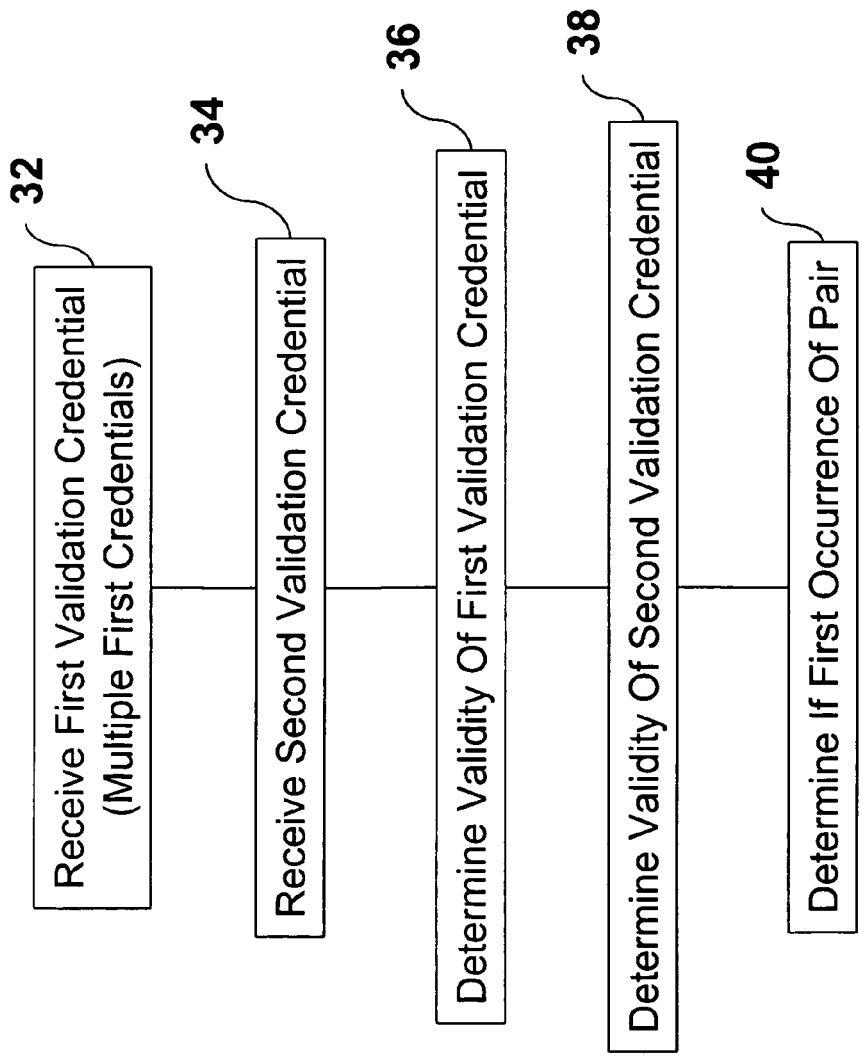
FIG. 4 is a flow diagram of an example process for providing one-time password validation.

FIG. 4 is a flow diagram of an example process for providing one-time password validation. A first validation credential is received at step 32. The first credential can comprise any appropriate credential, such as a password, a username, a passcode, or a combination thereof, for example. In an example embodiment, the received first credential is one of multiple first credentials. For example, a user can have several passwords that will allow the user to conduct secure transactions, and/or allow access to a system. The multiple passwords can result in several valid validation credentials, any one of which can be used for validation. Any one of the valid validation credentials can be received at step 32.

The second validation credential is received at step 34. The second validation credential can be any appropriate validation credential that is indicative, at least in part, of the source of the first and second credentials. For example, the second credential can comprise an identifier of a processor providing the first and second credentials, such as an indication of the serial number, the model number, or the like, of the processor providing the first and second credentials. The second credential can comprise a value assigned by a network to the processor providing the first and second credentials (e.g., CP 1.1 as depicted in FIG. 1). The second credential can comprise an indication of the location of the processor providing the first and second credentials, such as an IP address and/or other network address, for example.

The validity of the first credential is determined at step 36. For example, the validity of the passcode provided by the user can be determined. That is, the first credential is determined to be valid or invalid at step 36. For example, if a passcode is a valid passcode, or one of multiple valid passcodes, the first credential is determined to be valid. Otherwise, the first credential is determined to be invalid. The validity of the second credential is determined at step 38. That is, the second credential is determined to be valid or invalid at step 38. For example, the validity of the identifier of the source of the first and second credentials is determined. If the source is not one of the allowed sources, the second credential is determined to be invalid. If the identifier is indicative of an allowed source, the second credential is determined to be valid.

It is determined, at step 40, if it is the first occurrence, as a pair, of the received first credential (e.g., validation credential) and the second credential (e.g., client processor identifier). That is, it is determined if the first credential and the second credential previously have been used for validation. For example, a passcode can be used several times for validation, as long as it is paired with a different source identifier each time it is used. Thus, a single passcode can be used for validation with several processors.

In an example embodiment, the first and second credentials are determined, as a pair, to be valid, if they are received within a predetermined period of time. In an example embodiment, the passcode is valid for a predetermined amount of time once it has been used. For example, the passcode could change every minute. And, the first client processor that gets the passcode from the user would get a positive response from the validation processor only if the passcode is correct in that minute (This assumes the user's physical token is synchronized with the validation processor before the user gets the token). After the first successful validation, however, the passcode could remain valid for a longer period, such as for the duration in which one client processor needs to contact another client processor in the context of the user. In another example, the first credential can comprise a passcode that is valid for a single calendar day, or for a predetermined number of hours (e.g., 24 hours). If the passcode is used for validation before or after that day, or after the predetermined time period, the passcode is determined to be invalid.

In yet another example embodiment, the validity of the validation credentials is determined in accordance with a predetermined order. Referring to FIG. 1, it is possible that authentication may start at various entities (client processors). In the description previously provided, no restriction was placed on the order in which the client processor authenticated themselves to the validation processor 14. In this example embodiment, however, a predetermined order is considered. The validation processor 14 could be knowledgeable of the relationship between the client processor in the system 12, and the user's authentication process. The validation processor 14 could allow validation in a specific order, or number of specific orders. For example, the validation processor 14 could allow validation, assuming all other criteria described above are met, if the client processor 16 authenticates before any other client processor in the system 12. Further, the validation processor could allow validation, assuming all other criteria described above are met, if the client processor 22 authenticates before any other client processor in the system 12. But the validation processor 14 could deny validation if the client processor 24 attempts authentication before any other client processor in the system 12. This embodiment could be advantageous in preventing an attacker who has acquired the user's passcode from accessing the system 12 in an order other than the user's authentication process (e.g., in accordance with the above example, the attacker would be denied access if attempting to access the system 12 via the client processor 24). In this example embodiment, client processors could be assigned to groups, and the order of validation in each group could be defined. A client processor could be assigned to more than one group.

Figure 5:
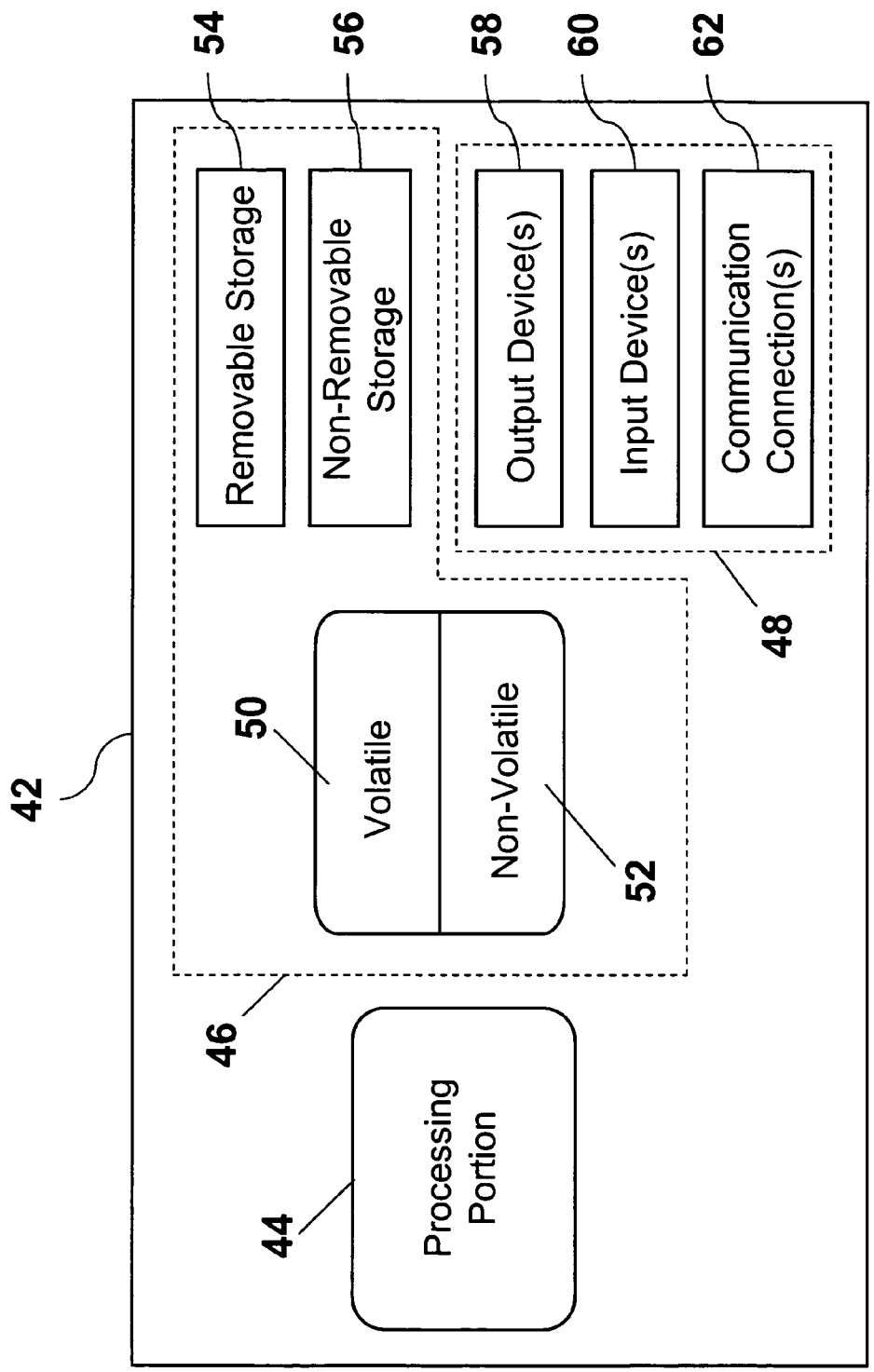
FIG. 5 is a diagram of an example validation processor 42.

FIG. 5 is a diagram of an example validation processor 42. The validation processor 42 comprises a processing portion 44, a memory portion 46, and an input/output portion 48. The processing portion 44, memory portion 46, and input/output portion 48 are coupled together (coupling not shown in FIG. 5) to allow communications therebetween. The validation processor 42 is capable of performing the operations associated with one-time password validation. For example, the processing portion 44 is capable of receiving validation credentials, determining the validity of validation credentials, determining if it is the first occurrence, as a pair, of validation credentials, and determining the order of received validation credentials. The memory portion 46 is capable of storing all parameters associated with one-time password validation, such as received validation credentials and knowledge of the one-time password system of which it is a member, for example.

The input/output portion 48 is capable of providing and/or receiving components, as describe above, utilized to accomplish one-time password validation. The input/output portion 48 can provide data to and receive data from another validation processor, and/or client processors. The input/output portion 48 is capable of receiving and/or providing validation credentials, and notification of validation.

Depending upon the exact configuration and type of processor, the memory portion 46 can be volatile (such as RAM and/or cache) 50, non-volatile (such as ROM, flash memory, etc.) 52, or a combination thereof. The validation processor 42 can have additional features/functionality. For example, the validation processor 42 can include additional storage (removable storage 54 and/or non-removable storage 56) including, but not limited to, magnetic or optical disks, tape, flash, smart cards or a combination thereof. Computer storage media, such as memory portion 46, 50, 52, 54, and 56, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the validation processor 42. Any such computer storage media can be part of the validation processor 42.

The validation processor 42 also can contain communications connection(s) 62 that allow the validation processor 42 to communicate with other devices. Communications connection(s) 62 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The validation processor 42 also can have input device(s) 60 such as keyboard, mouse, pen, voice input device, touch input device, etc. Output device(s) 58 such as a display, speakers, printer, etc. also can be included.

While it is envisioned that numerous embodiments of one-time password validation in a multi-entity environment are particularly well-suited for computerized systems, nothing in this document is intended to limit the scope thereof. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for one-time password validation in a multi-entity environment, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for one-time password validation in a multi-entity environment.

The program(s) can be implemented in assembly or machine language, if desired. In any case, the language can be a compiled or interpreted language, and combined with hardware implementations. The methods and apparatuses for one-time password validation in a multi-entity environment also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for one-time password validation in a multi-entity environment. When implemented on a general-purpose processor, the program code combines with the processor to provide a unique apparatus that operates to invoke the functionality of one-time password validation in a multi-entity environment. Additionally, any storage techniques used in connection with one-time password validation in a multi-entity environment can invariably be a combination of hardware and software.

While one-time password validation in a multi-entity environment has been described in connection with the example embodiments of the various figures, it is to be understood that other similar embodiments can be used or modifications and additions can be made to the described embodiments for performing the same functions for one-time password validation in a multi-entity environment without deviating therefrom. Therefore, one-time password validation in a multi-entity environment as described herein should not be limited to any single embodiment, but rather should be construed in breadth and scope in accordance with the appended claims.

What is claimed:

1. A method comprising:
   receiving, in a validation processor, a plurality of a predetermined number of first credentials of the same type that uniquely identifies a user, the plurality of received first credentials indicative of being from a first client processor;
   receiving, in the validation processor, a second credential that uniquely identifies the first client processor, the second credential indicative of being from the first client processor;
   determining, by the validation processor, each of the received plurality of first credentials and the second credential, as respective pairs, constitute a first unique pair that is valid for a one-time validation based on:
      finding each of the received first credentials is determined, by the validation processor, to be valid;
      finding it is a first occurrence, as respective pairs, of each of the received plurality of first credentials and the second credential;
      finding that the respective pairs of the received plurality of first credentials and the second credential has not been previously used for a secure communication;
      finding that the plurality of received first credentials is received in a predetermined order; and
   based on the result of the one-time validation, rejecting the respective pair of the received plurality of first credentials and the second credential if the respective pair has been previously used for the secure communication, and accepting the respective pair, as the first unique respective pair, if the plurality of received first credentials and the second credential pair if the first unique pair has not previously been used for the secure communication;
   providing, by the validation processor, an indication that the plurality of received first credentials and the second credential constitute the first unique pair that is valid for a one-time validation to an intermediate processor;
   tracking, by the intermediate processor, the validation based on the indication provided by the validation processor; and
   initiating the secure communication via a computer network using the first unique pair.

2. A method in accordance with claim 1, wherein:
   the type of the received plurality of first credentials comprises a passcode that is uniquely associated with a single user; and
   the second credential comprises a source identifier indicative of the first client processor.

3. A method in accordance with claim 2, wherein the source identifier is indicative of at least one of a serial number of the first client processor or a network assigned value of the first client processor.

4. A method in accordance with claim 2, wherein the source identifier is indicative of a location of the first client processor.

5. A method in accordance with claim 2, wherein the source identifier is indicative of an IP address of the first client processor.

6. A method in accordance with claim 1, wherein the received plurality of first credentials and the second credential are valid for a predetermined amount of time.

7. A method in accordance with claim 1, further comprising determining the received plurality of first credentials and the second credential, as respective pairs, valid by receiving the respective pairs within a predetermined period of time.

8. A method in accordance with claim 1, further comprising:
   receiving in the validation processor, from a second client processor, the plurality of first credentials of the same type that uniquely identifies the user;
   receiving in the validation processor, from the second client processor, a third credential that uniquely identifies the second client processor;
   determining, by the validation processor, that each of the received plurality of first credentials and the third credential, as respective pairs, constitute a second unique pair, wherein the determination comprises:
      finding that it is a first occurrence, as respective pairs, of the received plurality of first credentials and the third credential; and
      finding that the respective pairs of the received plurality of first credentials and the third credential has not been previously received from the second client processor;
   providing, by the validation processor, the determination to the intermediate processor; and
   tracking, by the intermediate processor, the determination.

9. A validation processor comprising:
   a processor; and
   a memory coupled to the processor, the memory having stored thereon executable instructions that when executed by the processor cause the processor to effectuate operations comprising:
      receiving a plurality of a predetermined number of first credentials of the same type that uniquely identifies a user, the plurality of received first credentials indicative of being from a first client processor;
      receiving a second credential that uniquely identifies the first client processor, the second credential indicative of being from the first client processor;
      determining that each of the received plurality of first credentials and the second credential, as respective pairs, constitute a first unique pair that is valid for a one-time validation based on:
         finding each of the received first credentials is determined, by the validation processor, to be valid;
         finding it is a first occurrence, as respective pairs, of each of the received plurality of first credentials and the second credential;
         finding that the respective pairs of the received plurality of first credentials and the second credential has not been previously used for a secure communication; and
         finding that the plurality of received first credentials is received in a predetermined order; and
      based on the result of the one-time validation, rejecting the respective pair of the received plurality of first credentials and the second credential if the respective pair has been previously used for the secure communication, and accepting the respective pair, as the first unique respective pair, if the plurality of received first credentials and the second credential pair if the first unique pair has not previously been used for the secure communication;

providing an indication that the plurality of received first credentials and the second credential constitute the first unique pair that is valid for a one-time validation to an intermediate processor;

tracking, by the intermediate processor, the validation based on the indication provided by the validation processor; and initiating the secure communication via a computer network the first unique pair.

10. A validation processor in accordance with claim 9, wherein:

the type of the received plurality of first credentials comprises a passcode that is uniquely associated with a single user; and the second credential comprises a source identifier indicative of the first client processor.

11. A validation processor in accordance with claim 10, wherein the source identifier is indicative of at least one of a serial number of the first client processor or a network assigned value of the first client processor.

12. A validation processor in accordance with claim 10, wherein the source identifier is indicative of a location of the first client processor.

13. A validation processor in accordance with claim 10, wherein the source identifier is indicative of an IP address of the first client processor.

14. A validation processor in accordance with claim 9, wherein the plurality of received first credential and the second credential are valid for a predetermined amount of time.

15. A validation processor in accordance with claim 9, the executable instructions further comprising:

receiving, from a second client processor, the plurality of first credentials of the same type that uniquely identifies the user;

receiving, from the second client processor, a third credential that uniquely identifies the second client processor; and determining that each of the received plurality of first credentials and the third credential, as respective pairs, constitute a second unique pair, wherein the determination comprises:

finding that it is a first occurrence, as respective pairs, of the received plurality of first credentials and the third credential; and finding that the respective pairs of the received plurality of first credentials and the third credential has not been previously received from the second client processor; and providing the determination to the intermediate processor, wherein the intermediate processor tracks the determination.

16. A computer readable storage memory comprising computer executable instructions that when executed by a validation processor cause the validation to perform the instructions comprising:

receiving, in the validation processor, a plurality of first credentials of the same type that uniquely identifies a user, the received plurality of first credentials indicative of being from a first client processor;

receiving, in the validation processor, a second credential that uniquely identifies the first client processor, the second credential indicative of being from the first client processor;

determining, by a validation processor, each of the received plurality of first credentials and the second credential, as respective pairs, constitute a first unique pair that is valid for a one-time validation based on:

finding each of the received first credentials is determined to be valid;

finding it is a first occurrence, as respective pairs, of each of the received plurality of first credentials and the second credential;

finding that the respective pairs of the received plurality of first credentials and the second credential has not been previously used for a secure communication;

finding that the plurality of received first credentials is received in a predetermined order; and based on the result of the one-time validation, rejecting the respective pair of the received plurality of first credentials and the second credential if the respective pair has been previously used for the secure communication, and accepting the respective pair, as the first unique respective pair, if the plurality of received first credentials and the second credential pair if the first unique pair has not previously been used for the secure communication;

providing, by the validation processor, an indication that the plurality of received first credentials and the second credential constitute the first unique pair that is valid for a one-time validation to an intermediate processor;

tracking, by the intermediate processor, the validation based on the indication provided by the validation processor; and initiating the secure communication via a computer network using the first unique pair.

\* \* \* \* \*